United States Patent
Galbi et al.

(10) Patent No.: US 12,099,408 B2
(45) Date of Patent: Sep. 24, 2024

(54) MEMORY STRIPING APPROACH THAT INTERLEAVES SUB PROTECTED DATA WORDS

(71) Applicant: Intel Corporation, Santa Clara, CA (US)

(72) Inventors: Duane E. Galbi, Wayland, MA (US); Matthew J. Adiletta, Bolton, MA (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 17/132,982

(22) Filed: Dec. 23, 2020

(65) Prior Publication Data

US 2021/0191811 A1  Jun. 24, 2021

(51) Int. Cl.
 *G06F 11/10* (2006.01)
 *G06F 11/07* (2006.01)
 *G06F 12/0879* (2016.01)

(52) U.S. Cl.
 CPC ........ *G06F 11/1068* (2013.01); *G06F 11/076* (2013.01); *G06F 11/0772* (2013.01); *G06F 12/0879* (2013.01)

(58) Field of Classification Search
 CPC .............. G06F 11/1068; G06F 11/076; G06F 11/0772; G06F 12/0879; G06F 12/0238; G06F 2212/1032; G06F 2212/7207; G06F 2212/7208; G06F 11/108

USPC ................................................... 714/763, 764
See application file for complete search history.

(56) References Cited

U.S. PATENT DOCUMENTS

| | | | | |
|---|---|---|---|---|
| 8,996,796 | B1* | 3/2015 | Karamcheti | G06F 11/1451 711/159 |
| 9,286,002 | B1* | 3/2016 | Karamcheti | G06F 11/1096 |
| 2003/0070055 | A1* | 4/2003 | Johnson | G06F 13/1642 711/158 |
| 2004/0163027 | A1* | 8/2004 | MacLaren | G06F 11/108 714/764 |
| 2009/0006900 | A1* | 1/2009 | Lastras-Montano | G06F 11/1044 714/42 |
| 2014/0281138 | A1* | 9/2014 | Karamcheti | G06F 11/2058 711/160 |
| 2016/0224414 | A1* | 8/2016 | Trombley | H03M 13/17 |
| 2019/0042449 | A1* | 2/2019 | Kang | G06F 11/1064 |
| 2021/0210156 | A1* | 7/2021 | Kim | G11C 29/42 |

* cited by examiner

*Primary Examiner* — Albert Decady
*Assistant Examiner* — Osman M Alshack
(74) *Attorney, Agent, or Firm* — Compass IP Law PC

(57) ABSTRACT

An apparatus is described. The apparatus includes a memory controller having logic circuitry to write a unit of write data into a plurality of memory chips according to a striping pattern that includes multiple protected sub words, each protected sub word including a smaller portion of the unit of write data and error correction coding (ECC) information calculated from the smaller portion of the unit of write data.

14 Claims, 9 Drawing Sheets

MEMORY STRIPING APPROACH THAT INTERLEAVES SUB PROTECTED DATA WORDS

FIELD OF INVENTION

The field of invention pertains generally to the computing sciences, and, more specifically, to memory striping approach that interleaves sub protected data words.

BACKGROUND

FIG. 1a shows a pair of "8+2" memory channels 101, 102 each having eight memory chips and two error correction code (ECC) chips. Both of the depicted 8+2 memory channels conform to a Joint Electron Device Engineering Council (JEDEC) Dual Date Rate "5" (DDR5) memory "sub-channel" implementation. Here, each memory chip is an "X4" memory chip and nominal read or write bursts consist of 16 cycles to transfer 512 bits (b)=64 bytes (B) of data and 128b of ECC that protects the data ((16 cycles)×(8 data chips)×(4 bits/chip)=512b=64B).

The block of information having the unit of data to be transferred 103 and the ECC information that protects the unit of data 104 can be referred to as an "ECC protected word of data" 105 (or more simply, a "protected word of data" or "protected data word").

If one of the ten memory chips within one of the channels (assume channel 101) begins to fail, incorrect information will be present in one or more bit locations of a protected data word 105 where the corresponding content is stored by the failing chip. In response, the host (e.g., memory controller) processes the protected data word's data 103 and ECC information 104 blocks to correct the incorrect information and identify the failing chip.

Thus, the channel can continue to operate even though one of the memory chips is failing. However, if another (second) memory chip on the same channel fails (such that two of the channel's ten memory chips is failing), the incorrect information within the protected data word 105 cannot be corrected.

As such, in response to a failed memory chip on a 8+2 memory channel, various computer systems are configured to switch-over (adapt) from the pair of 8+2 memory channels 101, 102 (a first 101 having the failed chip and a second 102 that does not have any failed chips) to a single 16+2 configuration (e.g., adaptive double device data correction (ADDDC)).

That is, upon the failure of the first memory chip on the first 8+2 channel 101, the failing memory chip is put out of use (retired) and protected data words that used to be stored only on the first channel 101 (pre-failure) are instead spread over the first and second channels 101, 102 (post-failure). Likewise, protected data words that used to be stored only on the second channel 102 are also spread over the first and second channels 101, 102.

FIG. 1b shows the two 8+2 channels 101, 102 of FIG. 1a after being re-configured to operate according to a 16+2 scheme. As observed in FIG. 1b, the bad chip 106 of the first sub-channel is identified as bad and is not used. Eight of the remaining nine good memory chips of the first channel 101 are used for data, and, the last (ninth) good memory chip of the first channel 101 is used for ECC. The second channel is arranged similarly (eight memory chips are used for data, one memory chip is used for ECC and one memory chip is a spare).

The resulting configuration is a 16+2 memory channel having sixteen memory chips used for data and two memory chips used for ECC. According to the 16+2 configuration, a protected data word 107 having 64B units of data 108a, 108b and 64 bits of corresponding ECC information 109 are read/written in eight cycles ((8 cycles)×(16 data chips)×(4 bits/chip)=512 bits=64B) (If only one of the regions have a bad chip a 16+3 configuration can be used to increase the ECC coverage or allow for more cache line bits to be used for other control functions (i.e. as cache-line meta bits)).

FIG. 1b shows two such protected data words 107, 110 being read/written in sequence over 16 cycles. Here, comparing the pre-fail 8+2 configurations of FIG. 1a with the post-fail 16+2 configuration of FIG. 1b, the expansion of the number of data memory chips from 8 to 16 allows for less ECC information (128b to 64b) per protected word of data 107, 110.

In order to effect 16+2 operation, the pair of channels 101, 102 operate in "lock-step" meaning the same address is used for the same cycle number across the two channels 101, 102. Here, a memory channel (whether a sub-channel or otherwise) includes a data bus and (e.g., ranks of) memory chips that are addressed with a same address value. Different memory channels in a same memory system, unless operating in lock-step, can concurrently address their respective memory chips with different addresses.

Although the channels 101, 102 can operate in lock-step simultaneously (the same cycle number exists at the same time for both channels), in theory, simultaneous execution is not a strict requirement (the different channels 101, 102 can read/write their respective "halves" of a protected data word at different absolute times).

FIGURES

A better understanding of the present invention can be obtained from the following detailed description in conjunction with the following drawings, in which.

DESCRIPTION

Figure 1A:
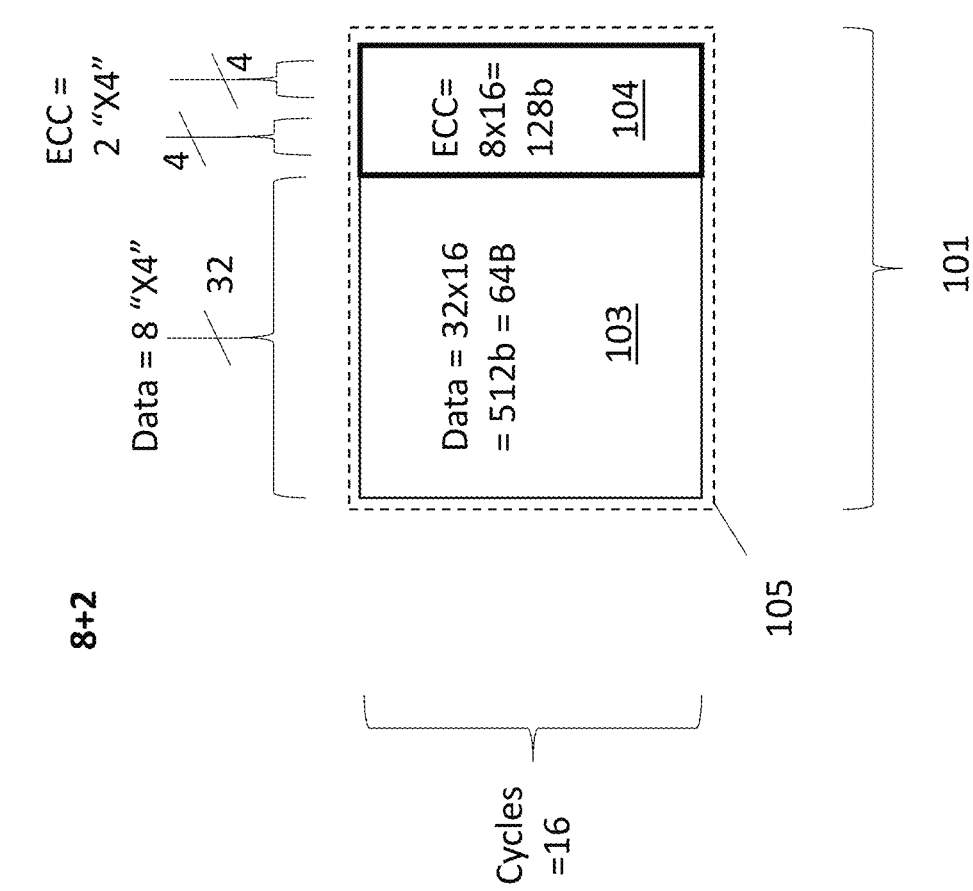
FIG. 1a shows a pair of 8+2 memory configurations.

A problem with the switch-over from a pair of independently operating 8+2 channels (FIG. 1a) to a 16+2 configuration (FIG. 1b) is that the "striping" as to which specific bits of which specific data or ECC field within a protected data word is written into which specific memory chip completely changes for all 20 memory chips of both channels 101, 102.

The drastic striping change results in extended down time or other memory interruption in which, e.g., all the content must be read from the pair of 8+2 configured channels and re-written into the 16+2 configuration according to the new 16+2 striping pattern. In essence, the switch-over includes a "blast radius" that affects the information content of every memory chip region in the pair of channels 101, 102 even though only one of the channels 101 has a bad memory chip region.106.

A better approach is to confine the blast radius to the memory chips of the channel 101 having the failing chip region 106. So doing will interrupt the 8+2 channel 101 having the bad chip, but all other 8+2 channels (such as channel 102) will remain unaffected and uninterrupted by the memory chip failure.

Figure 2:
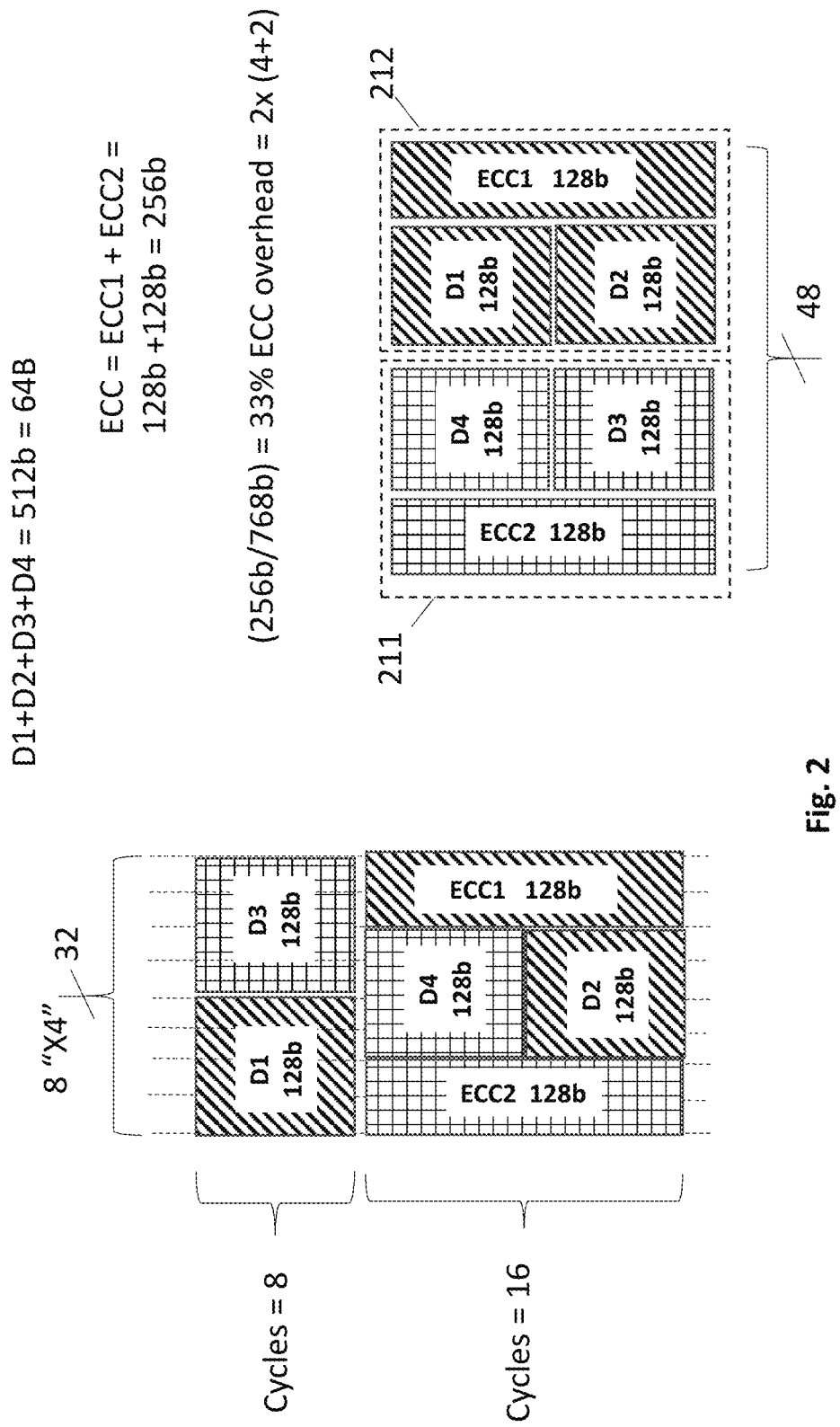
FIG. 2 shows a first embodiment of an improved memory striping approach.

FIG. 2 shows an embodiment of the improved approach. FIG. 2 shows the single channel 101 having the failing chip region being re-striped so that the amount of ECC information per 64B unit of data is increased. In the particular embodiment of FIG. 2, as explained in more detail below, the data content 103 of a pre-failure protected data word 105 (FIG. 1a) is broken down into two smaller "protected sub words" 211, 212 each having 32B of data and 128b of ECC. Here, the ratio of ECC to data is higher in the protected sub words 211, 212 (128b:256b=1:2) than in the pre-failure protected word 105 (128b:512b=1:4) which allows the channel 101 to recover corrupted data if another (second) memory chip in the channel 101 fails.

Moreover, consistent with the blast radius characteristic, note that in the prior art scenario described in the Background, the capacity of the channel that is created in response to the chip failure (16+2=18 memory chips) is the same capacity of the channel that suffered the chip failure (8+2=10 memory chips). By contrast, in the improved approach of FIG. 2, the capacity of the channel that is created in response to the chip failure (8 memory chips) is smaller than the capacity of the channel that suffered the chip failure (8+2=10 memory chips). Thus, the re-striping that is responsive to a chip failure requires the software to operation with a smaller amount of physical memory. Software will need to react appropriately to this new physical memory limitation.

As described immediately below, after re-striping, information is transferred across eight of the remaining nine memory chips (the ninth memory chip is regarded as a spare and can be called into use if the channel suffers a second memory chip failure). The information that is transferred over the eight memory chips is deemed by the host to be organized into different blocks of data (D1, D2, D3 and D4) and ECC information (ECC1 and ECC2) that the host is able to organize/arrange into the pair of protected sub words (specifically, a first protected sub word corresponds to D1+D2+ECC1 and a second protected sub word corresponds to D3+D4+ECC2). During a read, the host processes the sub words separately. That is, D1, D2 and ECC1 are processed together to correct any errors in D1 and D2, and, D3, D4 and ECC2 are processed together to correct any errors in D3 and D4.

After both sub words are corrected, the host then combines D1, D2, D3 and D4 to form the original 64B unit of data. Here, e.g., the larger computer accesses/addresses memory in data units of 64B because, e.g., caches between the machine's processors and memory are organized into 64B cache line slots. Thus, as far as the computer is concerned, memory is still accessed/addressed in 64B data units. The memory channel 101, however, has been re-striped to protect against a second memory chip failure by breaking a 64B unit of data into two separate protected words each having a data unit size of 32B.

As mentioned above, the increase in total ECC information per 64B unit of data provides sufficient protection to maintain error correction in the event that a next (second) memory chip in the channel fails. This stands in contrast to the approach described in the Background where, upon switchover to a 16+2 scheme, the number of memory chips per 64B of data is expanded 108a, 108b to reduce the number of errors per protected word which, in turn, allows for a reduction in the amount of ECC information per 64B unit of data (64b:64B=1:8).

Thus, whereas the prior art approach of switching over to a 16+2 configuration reduces the ratio of ECC to data per protected data word from the pre-failure 8+2 configuration (from 1:4 to 1:8), by contrast, the new approach of FIG. 2 increases the ratio of ECC to data per protected data word (from 1:4 to 1:3).

As observed in FIG. 2, the increase in the ratio of ECC information per protected data word is affected by re-striping into blocks D1 through D4 and ECC1, ECC2 as described above, and, consuming more cycles per transfer of 64B of data. That is, whereas the pre-fail memory channel 101 of FIG. 1 consumes 16 cycles to transfer 64B of protected data 103, by contrast, the improved approach of FIG. 2 consumes 24 cycles (16+8).

In various implementations, half (chop) bursts of 8 cycles actually consume 16 cycles such that 32 total cycles are consumed by the improved approach. For ease of discussion this aspect is disregarded in the discussions that follow. That is, "8 cycles" means an amount of information equal to 8 W is transferred, where W is the bus width, irrespective of how many cycles are actually consumed.

Even more generally, the different transfers observed in FIG. 2 can be characterized as "full burst" (16 cycles as depicted) and "half burst" (8 cycles as depicted). Alternate embodiments could possess different numbers of cycles and/or amounts of data per full burst and per half burst. For ease of discussion the remainder of the description will refer to 16 cycles and 8 cycles. However, the reader should recognize that such transfers can be more generally described as "full burst" and "half burst" respectively. As can been seen in FIG. 2, the data and ECC blocks of the two different protected sub words 211, 212 are interleaved across the nine memory chips and 24 cycles to form a single unit of transfer of 64B of data. A number of alternate embodiments can assign data or ECC to different blocks than those depicted in FIG. 2 yet still form two protected sub words that protect 32B of data with 128b of ECC.

A condition of the re-striping pattern, however, is that for any particular sub protected word, each of the eight memory chips only store data or ECC for that protected sub word. Notably, the condition is met for both protected sub words even though some memory chips store data for one of the protected sub words and ECC for the other of the protected sub words (the two leftmost chips and two rightmost chips).

The condition can be viewed as a translation into additional "effective" memory chips that, in terms of ECC coverage, effectively form a concurrent pair of 4+2 schemes. That is, although an additional 8 cycles are consumed to fully form both protected sub words 211, 212, once formed, the resultant is a 48 bit wide data structure having both protected sub words. Here, the 48 bit wide data structure corresponds to a total of twelve effective memory chips (12×4=48) such as a pair of concurrently operating 4+2 configurations.

Although the above discussion of the improved approach of FIG. 2 has emphasized keeping all re-striped information on the same channel 101, in theory, the 8 cycle burst can occur on a different memory channel than the memory channel where the 16 cycle burst occurs. Thus, for example, blocks D1 and D3 can be accessed during a half burst on another memory channel while blocks D2, D4 and both ECC blocks are being accessed on memory channel 101 (thus, data and/or ECC information for a same protected sub word can be provided from different interfaces (or a same interface as suggested by FIG. 2). In this case, the incorporation of the additional ECC information is a memory capacity hit rather than a memory access time hit. In still other possible cases, the half burst is not performed simultaneously with the full burst which results in the same memory capacity hit and an additional latency hit.

Figure 3:
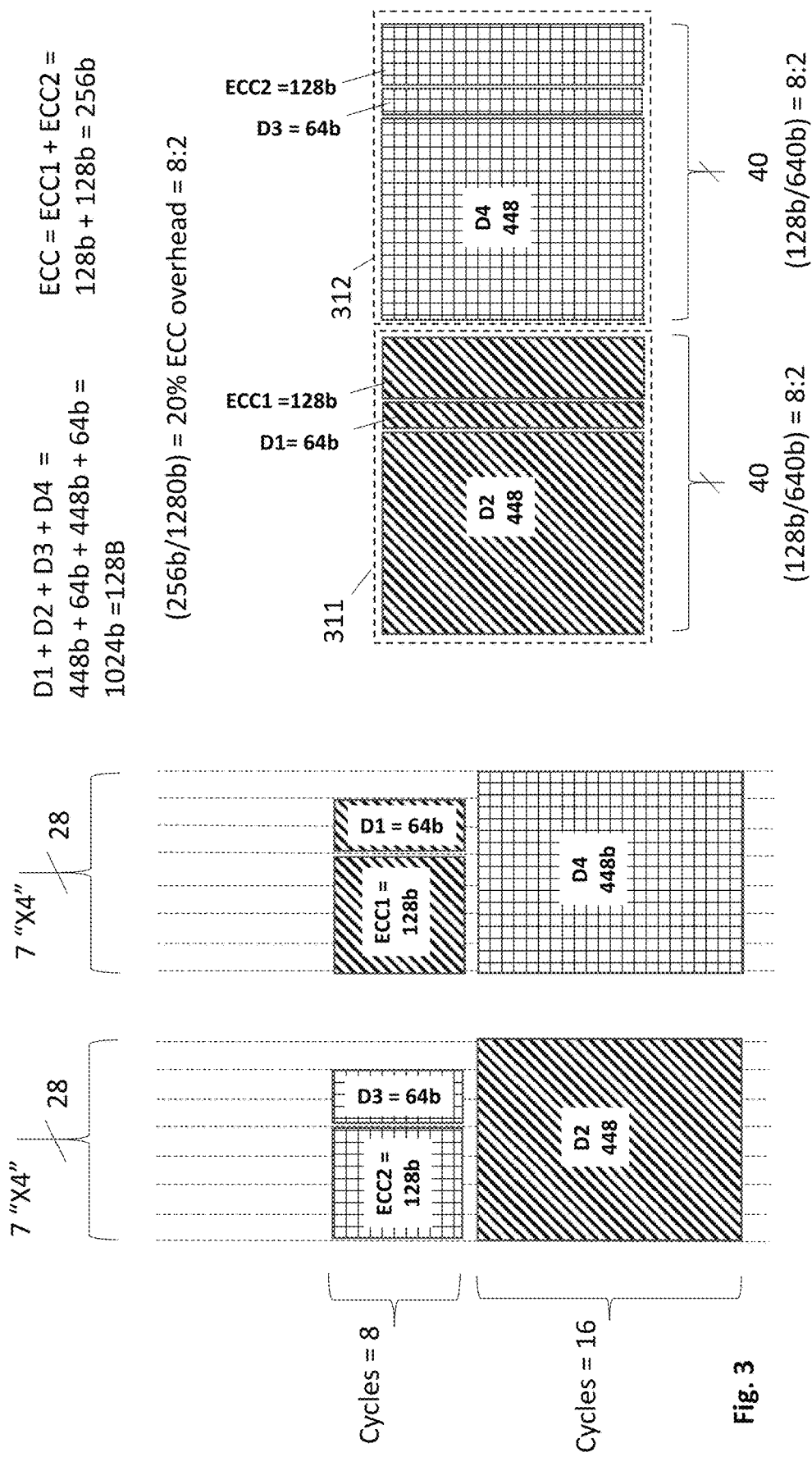
FIG. 3 shows a second embodiment of an improved memory striping approach.

Whereas the embodiment of FIG. 2 was directed to re-striping in response to a failing memory chip on a memory system that transfers data in units of 64B, by contrast, the embodiment of FIG. 3 is directed to a re-striping of a memory system that transfers data in units of 128B. A system that transfers data in units of 128B can, as just one example, operate like the 16+2 configuration described above with respect to FIG. 1b, but where the protected data word is formed as a combination of the protected data words 107, 110 observed in FIG. 1b (all four data units of words 107, 110 are combined to form the data that is protected by the combined ECC fields of words 107, 110).

The re-striping embodiment of FIG. 3, like the approach of FIG. 2, breaks the protected word of the prior configuration into two smaller protected sub words 311, 312, where, the data unit of each protected sub word is half the size of the prior configuration. Specifically, with the prior configuration having a data unit size of 128B, the protected sub words 311, 312 each have data unit sizes of 512b=64B. Each smaller protected sub word has its respective data and ECC blocks processed in isolation of the other protected sub word. In the case of a read, if the read data from both protected sub words is valid, the respective 512b data units from both protected sub words are combined to form a final 1024b data unit.

As observed in FIG. 3, the striping approach includes two 448b data blocks D2, D4 that are dedicated to different protected sub words and that each consume 16 cycles across seven memory chips. Another 8 cycles are consumed transferring residue 64b data blocks D1, D3 for the different protected sub words and 128b ECC blocks ECC1, ECC2 for the different protected sub words. Here, a residue and ECC block pair only consume 6 memory chips each.

Thus, if the same memory chips used to transfer one of the large data blocks (e.g., D2) are also used to transfer the appropriate residue data block and ECC block pair (e.g., D3 and ECC2), the entire approach only consumes 14 memory chips (seven chips per transfer of a single large data block, residue block and ECC block). Thus, assuming the prior 16+2 configuration consumed 18 memory chips, the re-striping approach can be used to manage the failure of 4 memory chips from the 16+2 configuration.

Like the approach of FIG. 2, the approach of FIG. 3 confines the blast radius to the channel/chips used to implement the prior 16+2 configuration (in the case of FIG. 3 the re-striping can be in response to failure of a memory chip of a memory channel that nominally transfers data in 128B units). That is, for example, the only memory chips that are re-striped are memory chips that were components of the prior 16+2 configuration. Moreover, again like the approach of FIG. 2, the re-striping can increase the ratio of ECC to data from the prior configuration (e.g., from 1:8 in the 16+2 configuration of FIG. 1b to 1:4 in the approach of FIG. 3).

Again, for each protected sub word the constraint of storing ECC information on different memory chips than the memory chips used to store data is honored (even though ECC and data for different protected sub words are kept on same memory chips). Here, as explained immediately below, the striping of FIG. 3 effectively implements a separate 8+2 scheme for each protected sub word which, in turn, allows errors to be corrected if another (e.g., fifth) memory chip fails.

As observed in FIG. 3, the residual data blocks D2, D3 and ECC blocks ECC1, ECC2 are re-shaped as drawn within the protected sub words 311, 312 to match the vertical height of the larger data blocks D2, D4. Here, generally, the structure of a protected word is defined and/or understood with the ECC information appended to the data block, and where, the ECC information and the data block have the same vertical height (so doing, e.g., defines the internal matrix computations used to create the ECC information from the data during a write operation, and, process the data and ECC information during a read operation).

With the residual data blocks D2, D3 and ECC blocks ECC1, ECC2 being re-shaped to expand from 8 cycles to 16 cycles in the vertical direction, their respective widths along the horizontal axis are reduced by half to keep their respective areas constant (keeping the areas constant is necessary to maintain the same ECC to data ratio within the protected sub word definition). The reduction by half along the horizontal axis translates into a failing memory chip introducing less errors into the protected word which contributes to the protected word's resilience against a chip failure.

For example, as drawn in protected sub words 311, 312 of FIG. 3, the residual data blocks D1 and D3 consume only one memory lane each. In reality, however, as depicted in the bus transfer diagrams, two memory chips are used to store the data of a single residual block D1. Thus, if one of these memory chips fail, the number of induced errors in the residual data block will be half of what it would have been if all of the residual data block's information were kept in a single memory as suggested by the protected sub word diagrams 311, 312. A similar situation exists with respect to the ECC blocks ECC1, ECC2.

Regardless, the structure of the protected sub words 311, 312 of FIG. 3 indicates that, like the approach of FIG. 2, a pair of concurrent 8+2 configurations have effectively been implemented. That is, although implemented with as little as 14 memory chips, the re-striping provides error protection as if 20 memory chips are being used.

Similar to the embodiment of FIG. 2, the 8 cycle transfers of the residual data blocks D1, D3 and the ECC blocks ECC1, ECC2 in FIG. 3 can be performed with physical memory chips that are different than the physical memory chips used to store the larger data blocks D2 and D4. In this case, rather than the re-striping causing a memory access time hit (the 8 cycles and 16 cycles are performed sequentially because they use the same memory chips), the re-striping causes a memory capacity hit (the 8 cycles are performed simultaneously with the 16 cycles but use different memory chips). In theory, if different memory chips are used to store the residual data blocks and ECC blocks than the larger data blocks, the 8 cycles can, but are not required to, be performed simultaneously with the 16 cycles.

Figure 4:
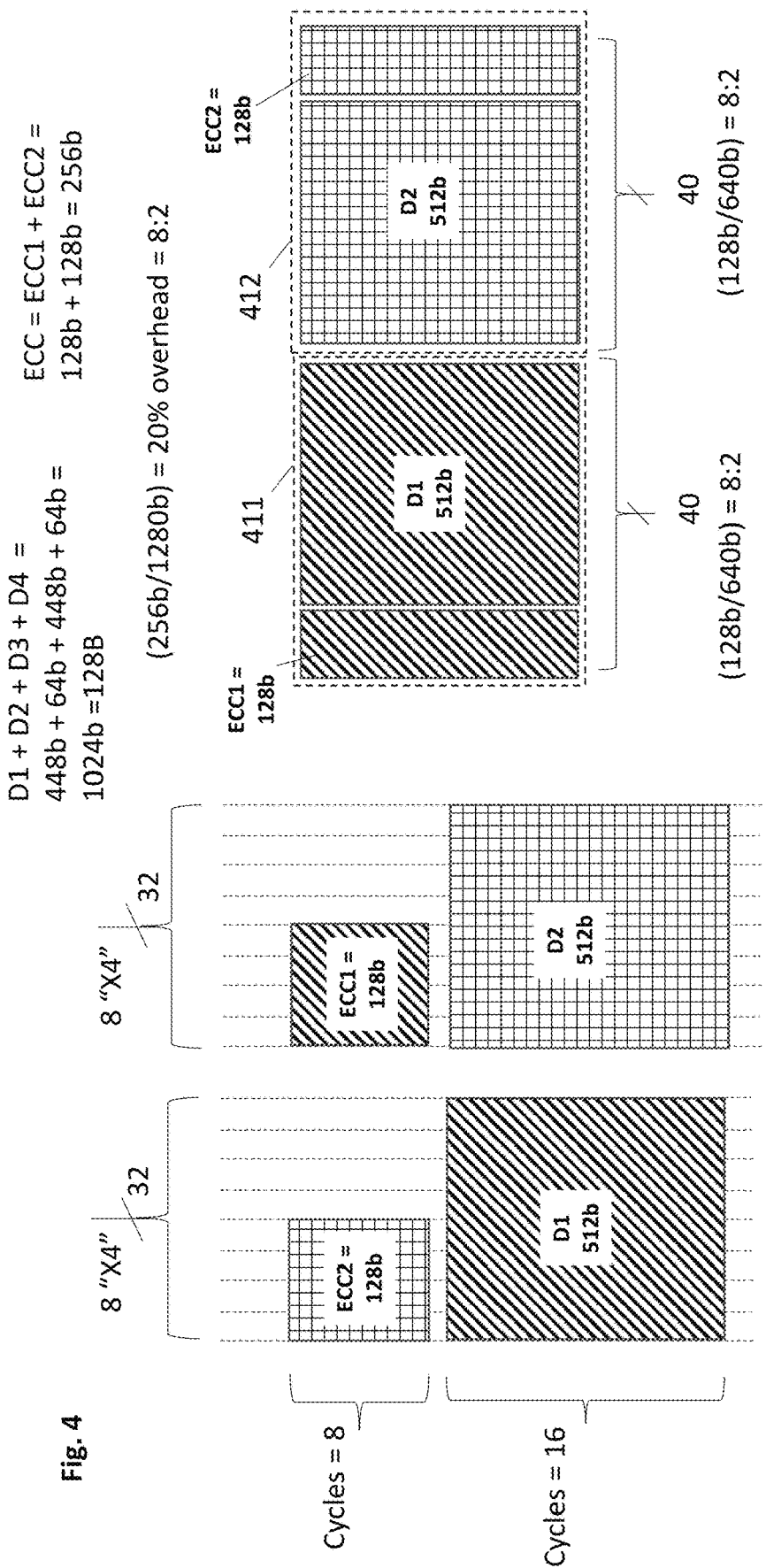
FIG. 4 shows a third embodiment of an improved memory striping approach.

FIG. 4 shows another striping embodiment for, e.g., re-striping from a prior 16+2 configuration. Like the previous embodiments of FIGS. 2 and 3, a pair of protected sub words 411, 412 whose data units D2, D4 are half the size (512b=64B) of the prior configuration's data unit (128B) are created. During a read operation the respective data and ECC information of each protected sub word are processed in isolation from the other protected sub word. If the data units from both protected sub words are valid, the pair of data units from both protected sub words are combined to yield a final read data unit of 128B.

In FIG. 4, a Dual in-line Memory Module (DIMM) is used that has the capability to have only half the chips of a single rank be written to. For example, the DIMM may have additional logic to process a chip enable signal such that only half the chips of a rank receive a chip enable for a specified read or write (e.g., a "half width" read or write command exists that, when sent to the DIMM, causes the DIMM to activate the chip enable signal for only half of the memory chips of the rank that is targeted by the command).

From FIG. 4, eight memory chips and sixteen cycles are consumed to transfer a 512b data unit for one of the protected sub words. Eight cycles and four memory chips are consumed to transfer a 128b ECC data word for one of the protected sub words. As with the previous embodiments, for a same protected sub word, ECC information is kept in different memory chips than data.

When the ECC information is reshaped to match the cycle height of a data unit, its memory width is cut by half. The resulting protected sub words 411, 412, like the approach of FIG. 3, yield an effective pair of concurrent 8+2 configurations (one effective 8+2 configuration for each protected sub word). As such, there exists a 1:4 ratio of ECC information to data within each protected sub word.

As with prior embodiments, the same memory chips can be used to store data and ECC from for different protected sub words in which case ECC transfers are done sequentially with data transfers. Alternatively, different physical memory chips can be used in which case more memory is consumed but concurrent/parallel transfers are possible.

As observed in FIG. 4, the 8 cycle transfer utilizes half the chips of the 16 cycle transfer. In the most efficient embodiments, but not the only possible embodiment, the unused chips of the 8 cycle transfer contain information for a next, consecutive data unit and corresponding protected sub words to accessed to/from the memory chips. That is, the ECC1 and ECC2 fields for the protected sub words of another 128B data unit (with different base address than the 128B data unit observed in FIG. 4) can be transmitted in the unused portions of the 8 cycle transfer observed in FIG. 4. As such, there can be interleaving of consecutively accessed data units. For example, a first 16 cycle burst transfers D1 and D2 of the protected sub words for a first 128B data unit, a following second 8 cycle burst transfers ECC1 and ECC2 for the protected sub words for the first 128B data unit and a second, following 128B unit, and, a next following 16 burst transfers D1 and D2 for the second, following 128B unit. Thus, all four protected sub words for a pair of 128B data units are transferred over a full, half, full burst pattern.

Figure 5:
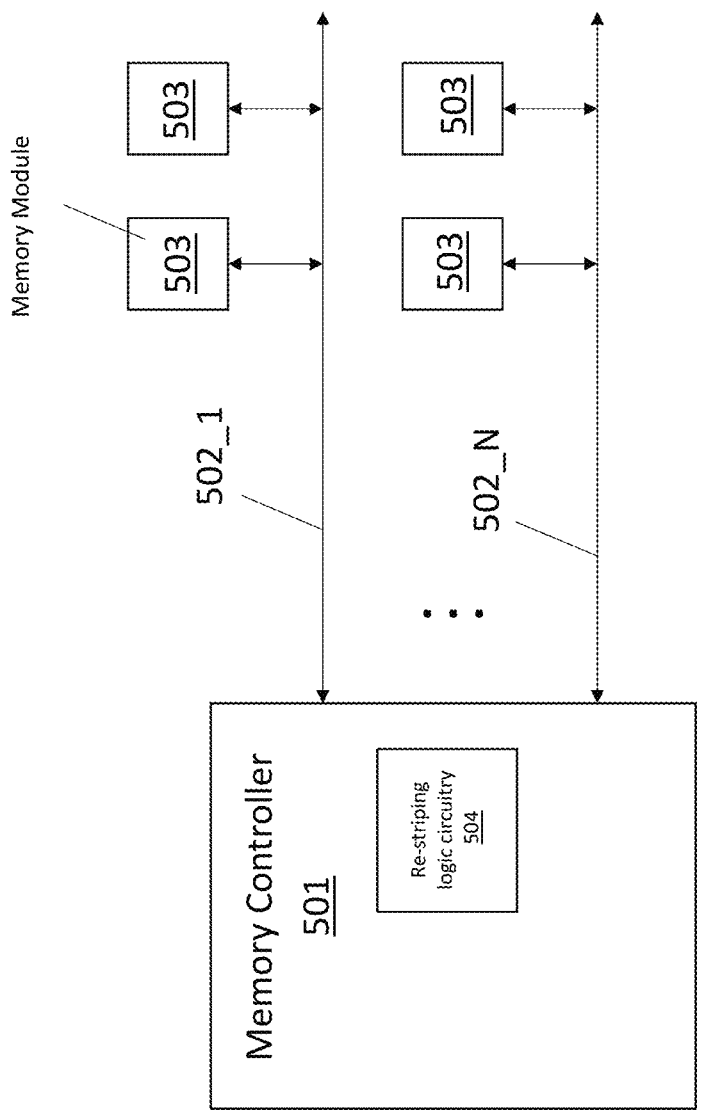
FIG. 5 shows memory channels coupled to a memory controller.

FIG. 5 shows a memory system implementation including a memory controller 501, multiple memory channels 502_1 through 502_N (one or more of which may be broken down into sub-channels) and respective memory modules 503 that are connected to the memory channels 502. The memory modules may be dual in-line memory modules (DIMMs), stacked memory chip memory modules, or other types of memory modules. The memory controller 501 includes re-striping logic circuitry 504 that is able to implement any/all of the aforementioned re-striping schemes described above.

The re-striping logic circuitry 504 therefore could be designed to, e.g., during a write operation, parse a received unit of write data into multiple smaller data units where each smaller data unit forms the data component of a protected sub word, calculating ECC information for each of the protected sub words from their respective smaller data units and then writing the protected sub words into the appropriate number of memory chips according to the striping pattern. For implementations where the original received unit of write data is larger than 64B (e.g., 128B as per the discussions of FIGS. 3 and 4), the appropriate memory chips could (but are not strictly required to in various memory system architectures) span more than one memory module and/or memory channel.

Likewise, during a write operation, the re-striping logic circuitry 504 could be designed to read the protected sub words from the appropriate memory chips in accordance with the striping pattern, perform error correction calculations on each protected sub word separately based on its smaller data unit and corresponding ECC information, and form a responsive full size read word by combining the smaller data units from the protected sub words if they are valid.

Additionally, some or all of the memory modules 503 may have logic circuitry to support special operations to implement the re-striping, such as, a memory module that supports a command that writes to and/or reads from less than all (e.g., half) of the memory chips of a particular rank that is targeted by the command. The memory chips of the memory modules 503 can be dynamic random access memory (DRAM), byte addressable write-in-place non-volatile memory (e.g., a three dimensional cross-point architecture memory having stacks of non-volatile resistive storage cells constructed above the semiconductor chip substrate, such as Optane™ memory from Intel Corporation), or a combination of DRAM and byte addressable write-in-place non-volatile memory.

It is pertinent to recognize that other embodiments not specifically described above are nevertheless taught by the teachings provided above. For example, other embodiments may divide the data unit into four sections to create four protected sub-words, divide the data unit into eight sections to create four protected sub-words, etc. Some of these embodiments may map directly into the striping patterns described above while others may exhibit their own striping pattern that, e.g., increases the ratio of ECC protection from pre-chip failure to post-chip failure, reduces the number of memory chips that are used from pre-chip failure to post-chip failure, confines the memory chips that are affected by the re-striping to the memory chips that existed on the memory channel or memory sub-channel that suffered the memory chip failure, constrains the striping pattern so that data and ECC are on different memory chips for any particular protected sub word even though at least one memory chip stores data and ECC of different protected sub words, etc.

It is also pertinent to recognize that when in the above description, a bad chip need not be a full bad chip but could just be a chip with a bad area of memory. The scheme described above would then just be applied to the bad areas of memory. The bad areas of memory could be identified by registers in the memory channel controller.

Additional possible characteristics include a single memory chip that contains both ECC information and data for the same protected sub word, but where, the ECC and data are stored in different "failure regions" of the particular memory chip. Here, a single memory chip is understood to have different failure regions, where different bits that are stored by the memory chip for a particular protected sub word are associated with different failure regions, and/or, one or more bits that are stored by the memory chip for the sub word are associated with the same failure region. For example, if a "failure region" is associated with a particular wire within the memory chip that is replicated in the memory array, some (first) bits of a same protected sub word may be transported with a same such wire, while other (second) bits of the same protected sub word may be transported with another instance of the wire. Here, the first bits are associated with a first failure region, while the second bits are associated with a second failure region. As such, the first bits may be used to store data or ECC of a protected sub word while the second bits may be used to store the other of data/ECC of the protected sub word. Bad failure regions can be paired with other bad failure regions, or good failure regions. For example, in a ×8 DRAM, one might be able to assume four I/O's correspond to one failure region and another four I/O's correspond to another failure region. Hence, from an ECC perspective this ×8 DRAM can be treated as two independent ×4 DRAMS, and a forty-bit 8+2 ECC scheme can be implemented with five ×8 memory chips.

Figure 1B:
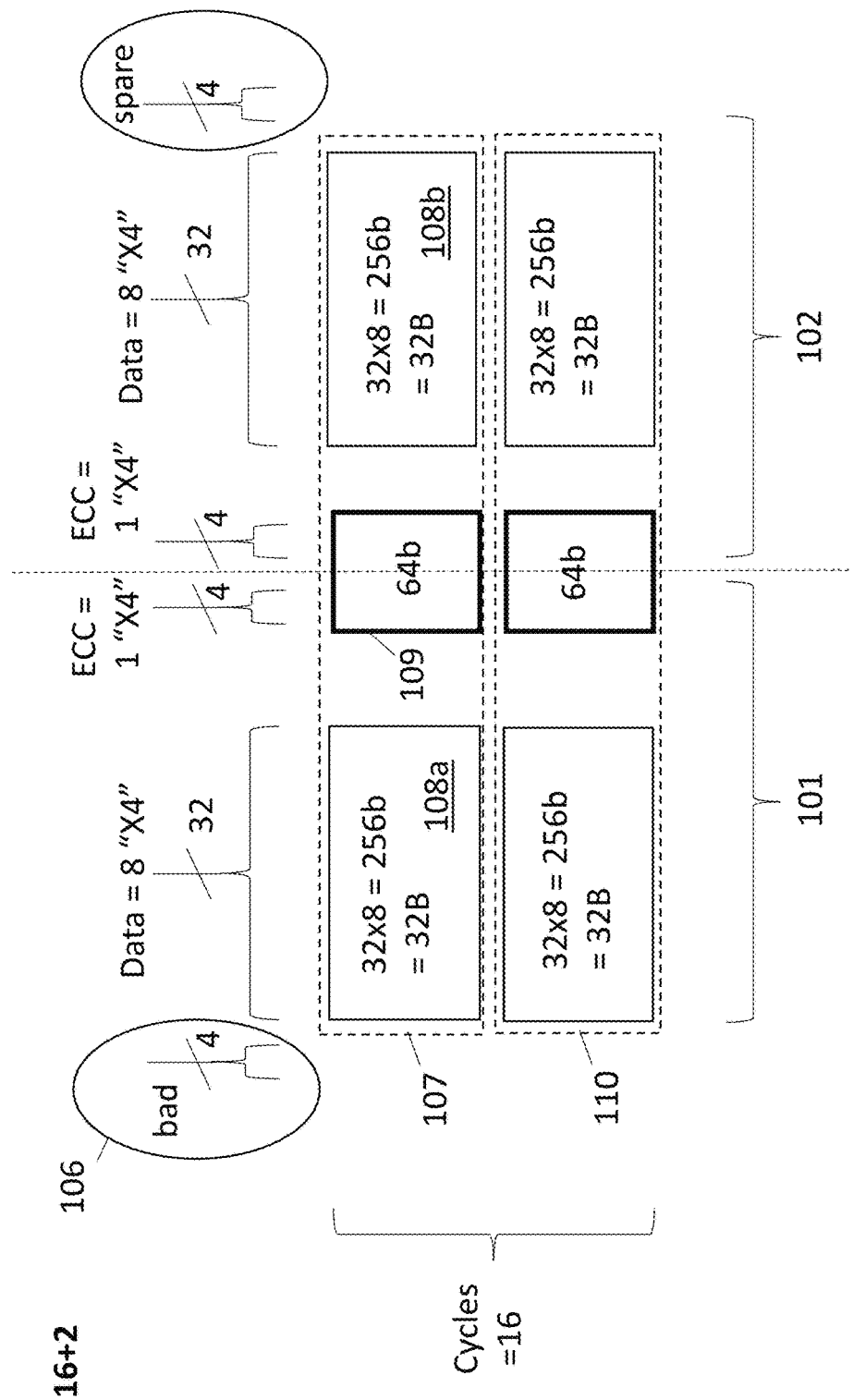
FIG. 1b shows a 16+2 memory configuration.

In various embodiments, any spare memory chips that remain after re-striping can be used to store even more ECC information. For example, if the original 8+2 configuration of FIG. 1a is re-striped to the approach of FIG. 2, the number of used chips changes from ten total memory chips in the configuration of FIG. 1a to eight used chips in the configuration of FIG. 2. With one of the original ten chips being deemed "bad", there is one "spare" chip remaining after re-striping to the approach of FIG. 2. If desired, the spare chip can be used in the re-striping of FIG. 2 to contain ECC information thereby increasing the ECC coverage per sub-word even further.

It is pertinent to recognize the D1, D2, etc. and ECC1 and ECC2 block arrangements observed in FIGS. 2, 3 and 4 are only exemplary. Generally speaking, the content of the different blocks can be allocated in many other patterns (e.g., so long as same memory chip failure regions are assigned data or ECC but not both, for a same protected sub word). For example, referring to FIG. 2, portions of ECC1 and ECC2 can be swapped such that a same memory chip stores ECC information for different protected sub words created from a same data unit.

Although embodiments above have increased ECC coverage after re-striping, note that in at least some respects actual ECC writing activity is reduced. For example, if the case of a prior (pre-failure) 16+2 configuration to a re-striping (post failure) approach of FIG. 3 or 4, ECC writing activity reduces from 16 cycles to 8 cycles (alternatively, fewer ECC chips can be written to over a longer number of cycles).

Although embodiments above have emphasized full size bursts and half size bursts, other implementation can use other combinations such as, e.g., a full size burst and a partial bursts that are other than "half" bursts (e.g., a number of substantive cycles that are other than half the number of substantive cycles as a full burst, and/or, a number of chips and/or memory chip I/Os that are other than half of the full width of chips and/or I/Os).

Figure 6:
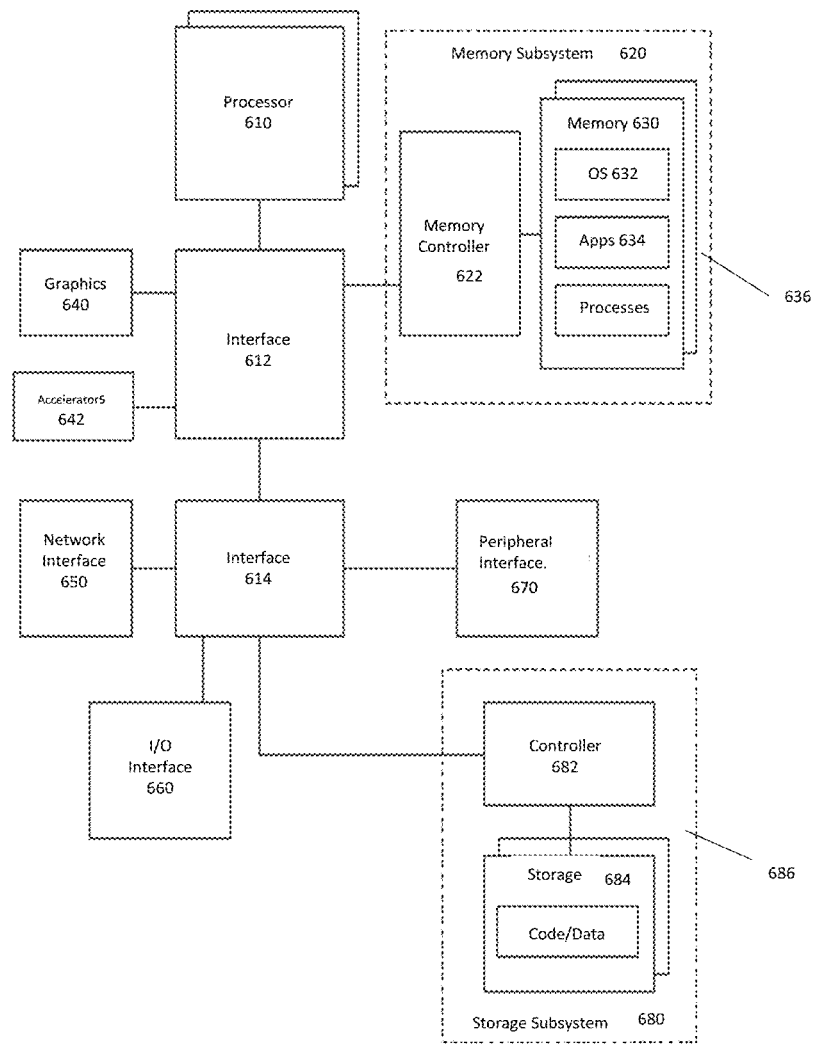
FIG. 6 shows a computing system.

FIG. 6 depicts an example system. The system can use the teachings provided herein. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), "X" processing units (XPUs), programmable control logic, and programmable processing elements such as field programmable gate arrays (FPGAs). Accelerators 642 can provide multiple neural networks, processor cores, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models. Any of the accelerators mentioned above or other accelerators may use a memory system (e.g., a local memory system of the accelerator, a main memory system of a computer, etc.) that implements one or more memory chip striping improvements in response to a chip failure as described above.

Memory subsystem 620 represents the main memory of system 600 and provides storage for code to be executed by processor 610, or data values to be used in executing a routine. Memory subsystem 620 can include one or more memory devices 630, volatile memory, or a combination of such devices. The memory subsystem 620, in various embodiments, is designed to implement one or more memory chip striping improvements in response to a chip failure as described above.

Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610. In some examples, a system on chip (SOC or SoC) combines into one SoC package one or more of: processors, graphics, memory, memory controller, and Input/Output (I/O) control logic.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, LPDDR5 (Low Power DDR 5, JESD209-5, originally published by JEDEC in February 2019), DDR5 (DDR version 5, JESD79-5, originally published by JEDEC in July 2020), HBM2 (HBM version 2), currently in discussion by JEDEC, or others or combinations of memory technologies, and technologies based on derivatives or extensions of such specifications. The JEDEC standards are available at www.jedec.org.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect express (PCIe) bus, a HyperTransport or industry standard architecture (ISA) bus, a small computer system interface (SCSI) bus, Remote Direct Memory Access (RDMA), Internet Small Computer Systems Interface (iSCSI), NVM express (NVMe), Coherent Accelerator Interface (CXL), Coherent Accelerator Processor Interface (CAPI), a universal serial bus (USB), or an Institute of Electrical and Electronics Engineers (IEEE) standard 1394 bus.

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state drive, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented as a disaggregated computing system. For example, the system 600 can be implemented with interconnected compute sleds of processors, memories, storages, network interfaces, and other components. High speed interconnects can be used such as PCIe, Ethernet, or optical interconnects (or a combination thereof). For example, the sleds can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Figure 7:
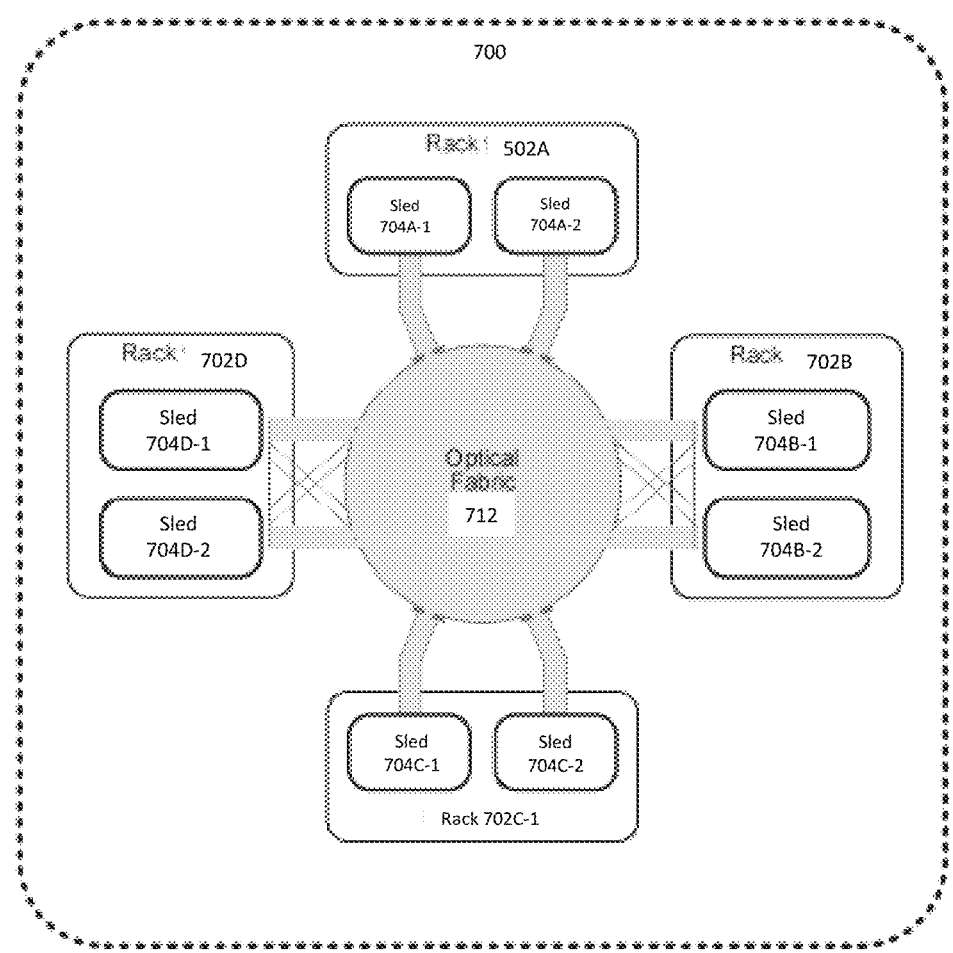
FIG. 7 shows a data center.

FIG. 7 depicts an example of a data center. Various of the above described re-striping embodiments can be used in or with the data center of FIG. 7. As shown in FIG. 7, data center 700 may include an optical fabric 712. Optical fabric 712 may generally include a combination of optical signaling media (such as optical cabling) and optical switching infrastructure via which any particular sled in data center 700 can send signals to (and receive signals from) the other sleds in data center 700. However, optical, wireless, and/or electrical signals can be transmitted using fabric 712. The signaling connectivity that optical fabric 712 provides to any given sled may include connectivity both to other sleds in a same rack and sleds in other racks. Data center 700 includes four racks 702A to 702D and racks 702A to 702D house respective pairs of sleds 704A-1 and 704A-2, 704B-1 and 704B-2, 704C-1 and 704C-2, and 704D-1 and 704D-2. Thus, in this example, data center 700 includes a total of eight sleds. Optical fabric 712 can provide sled signaling connectivity with one or more of the seven other sleds. For example, via optical fabric 712, sled 704A-1 in rack 702A may possess signaling connectivity with sled 704A-2 in rack 702A, as well as the six other sleds 704B-1, 704B-2, 704C-1, 704C-2, 704D-1, and 704D-2 that are distributed among the other racks 702B, 702C, and 702D of data center 700. The embodiments are not limited to this example. For example, fabric 712 can provide optical and/or electrical signaling.

Figure 8:
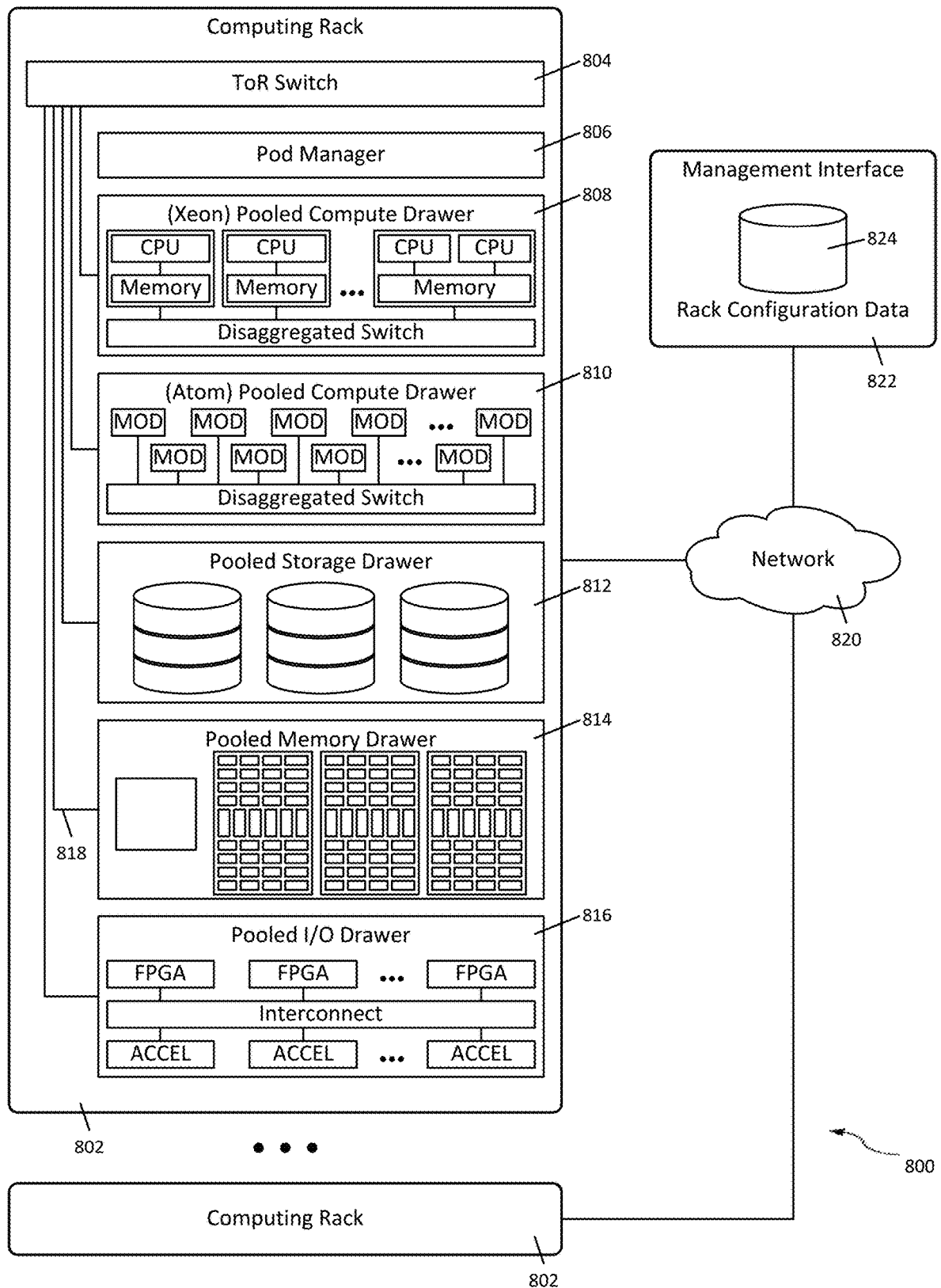
FIG. 8 shows multiple racks.

FIG. 8 depicts an environment 800 includes multiple computing racks 802, each including a Top of Rack (ToR) switch 804, a pod manager 806, and a plurality of pooled system drawers. Various equipment within the rack may have memory that is implemented with one or more striping improvements as discussed above. Generally, the pooled system drawers may include pooled compute drawers and pooled storage drawers to, e.g., effect a disaggregated computing system. Optionally, the pooled system drawers may also include pooled memory drawers and pooled Input/Output (I/O) drawers. In the illustrated embodiment the pooled system drawers include an INTEL® XEON® pooled computer drawer 808, and INTEL® ATOM™ pooled compute drawer 210, a pooled storage drawer 212, a pooled memory drawer 214, and an pooled I/O drawer 816. Each of the pooled system drawers is connected to ToR switch 804 via a high-speed link 818, such as a 40 Gigabit/second (Gb/s) or 100 Gb/s Ethernet link or an 100+ Gb/s Silicon Photonics (SiPh) optical link. In one embodiment high-speed link 818 comprises an 800 Gb/s SiPh optical link.

Again, the drawers can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Multiple of the computing racks 800 may be interconnected via their ToR switches 804 (e.g., to a pod-level switch or data center switch), as illustrated by connections to a network 820. In some embodiments, groups of computing racks 802 are managed as separate pods via pod manager(s) 806. In one embodiment, a single pod manager is used to manage all of the racks in the pod. Alternatively, distributed pod managers may be used for pod management operations.

Multiple rack environment 800 further includes a management interface 822 that is used to manage various aspects of the RSD environment. This includes managing rack configuration, with corresponding parameters stored as rack configuration data 824.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

The invention claimed is:
1. An apparatus, comprising:
a memory controller comprising logic circuitry to write a unit of write data into a plurality of memory chips of a memory channel according to a striping pattern that comprises multiple protected sub words, each protected sub word comprising a smaller portion of the unit of write data and error correction code (ECC) information calculated from the smaller portion of the unit of write data, wherein, the memory controller is to implement the striping pattern in response to a failure of a memory chip of the memory channel, and wherein, the striping pattern causes a ratio of ECC information to write data to increase after the failure of the memory chip and causes the memory channel's utilized number of memory chips to decrease after the failure of the memory chip.

2. The apparatus of claim 1 wherein the striping pattern further comprises first information of more than one of the protected sub words during a full burst, and, second information of the more than one of the protected sub words during a partial burst.

3. The apparatus of claim 1 wherein the logic circuitry is further to:
process the respective data and error correction coding (ECC) of the multiple protected sub words independently; and,
if the respective data is valid, combine the respective data of the multiple protected sub words to form a unit of read data.

4. The apparatus of claim 1 wherein the striping pattern forms two protected sub words, where, the two protected sub words have different halves of the unit of write data.

5. The apparatus of claim 1 wherein the unit of write data is 64 bytes.

6. The apparatus of claim 1 wherein the unit of write data is 128 bytes.

7. The apparatus of claim 1 wherein data and error correction coding (ECC) from a same protected sub word are not stored in a same failure region of a same one of the plurality of memory chips.

8. The apparatus of claim 1 wherein at least one of the plurality of memory chips stores data and error correction coding (ECC) for different ones of the protected sub words.

9. A computing system, comprising:
a processor;
memory that the processor is to access; and,
a memory controller coupled between the processor and the memory, the memory controller comprising logic circuitry to write a unit of write data into a plurality of memory chips, of a memory channel of the memory according to a striping pattern that comprises multiple protected sub words, each protected sub word comprising a smaller portion of the unit of write data and error correction coding (ECC) information calculated from the smaller portion of the unit of write data, wherein, the memory controller is to implement the striping pattern in response to a failure of a memory chip of the memory channel, and wherein, the striping pattern causes a ratio of ECC information to write data to increase after the failure of the memory chip and causes the memory channel's utilized number of memory chips to decrease after the failure of the memory chip.

10. The computing system of claim 9 wherein the striping pattern further comprises first information of more than one of the protected sub words during a full burst, and, second information of the more than one of the protected sub words during a half burst.

11. The computing system of claim 9 wherein the logic circuitry is further to:
process the respective data and error correction coding (ECC) of the multiple protected sub words independently; and,
if the respective data is valid, combine the respective data of the multiple protected sub words to form a unit of read data.

12. The computing system of claim 9 wherein the striping pattern forms two protected sub words, where, the two protected sub words have different halves of the unit of write data.

13. The computing system of claim 9 wherein the plurality of memory chips are on a memory module that allows less than all the memory chips of a rank to be accessed.

14. A method, comprising:
in response to a memory chip failure of a memory channel, applying a new write striping pattern to a plurality of memory chips of the memory channel, wherein, the new write striping pattern comprises multiple protected sub words, each protected sub word comprising a smaller portion of a unit of write data and error correction coding (ECC) information calculated from the smaller portion of the unit of write data, wherein, the new write striping pattern causes a ratio of ECC information to write data to increase after the memory chip failure and causes the memory channel's utilized number of memory chips to decrease after the memory chip failure.

* * * * *